May 6, 1952

H. M. STUELAND 2,596,053

COORDINATED CLUTCH AND BRAKE CONTROL
FOR VEHICLE DRIVING MECHANISM

Filed May 16, 1946

INVENTOR.
HAROLD M. STUELAND
BY
ATTORNEYS.

May 6, 1952
H. M. STUELAND
2,596,053
COORDINATED CLUTCH AND BRAKE CONTROL
FOR VEHICLE DRIVING MECHANISM
Filed May 16, 1946
5 Sheets-Sheet 2
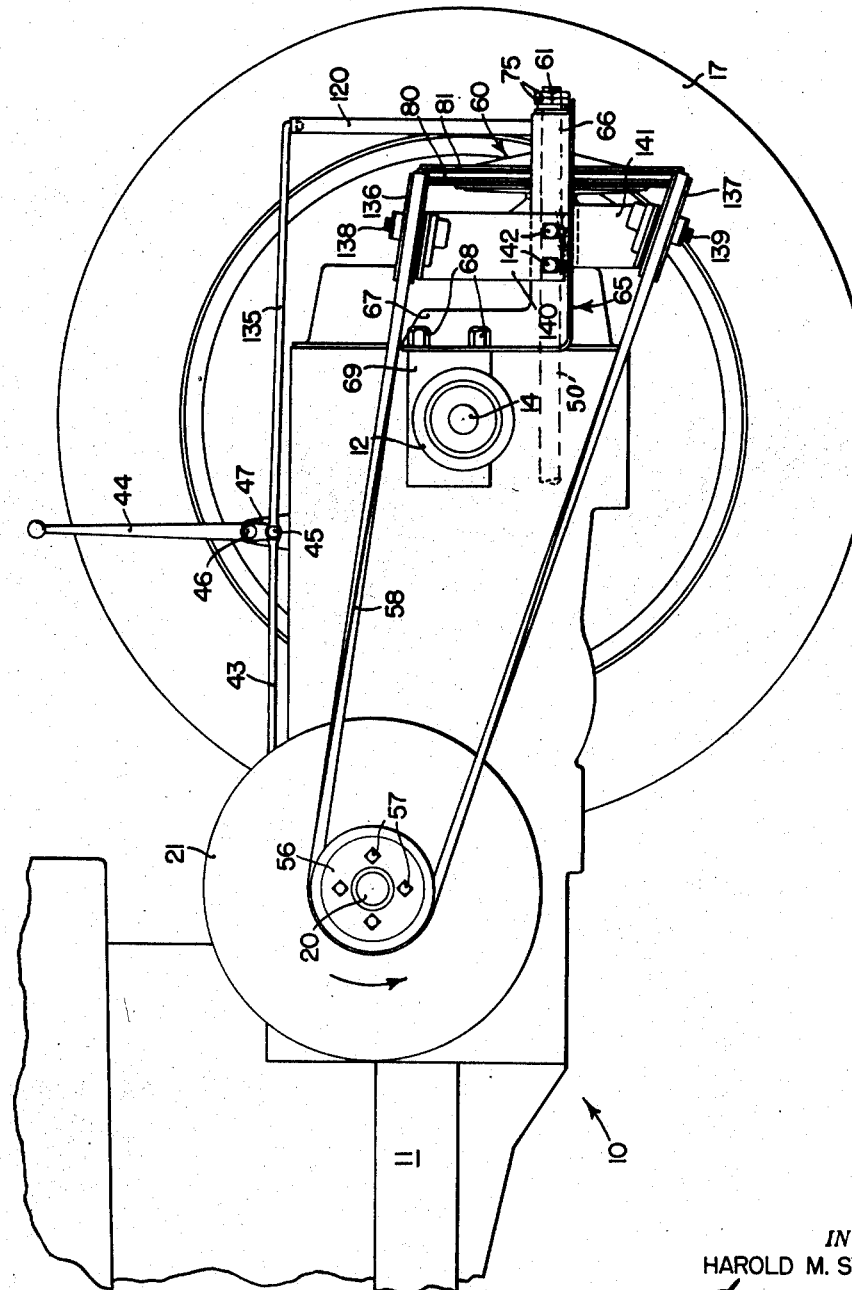
FIG. 2
INVENTOR.
HAROLD M. STUELAND
BY 
ATTORNEYS.

May 6, 1952    H. M. STUELAND    2,596,053
COORDINATED CLUTCH AND BRAKE CONTROL
FOR VEHICLE DRIVING MECHANISM
Filed May 16, 1946    5 Sheets-Sheet 3
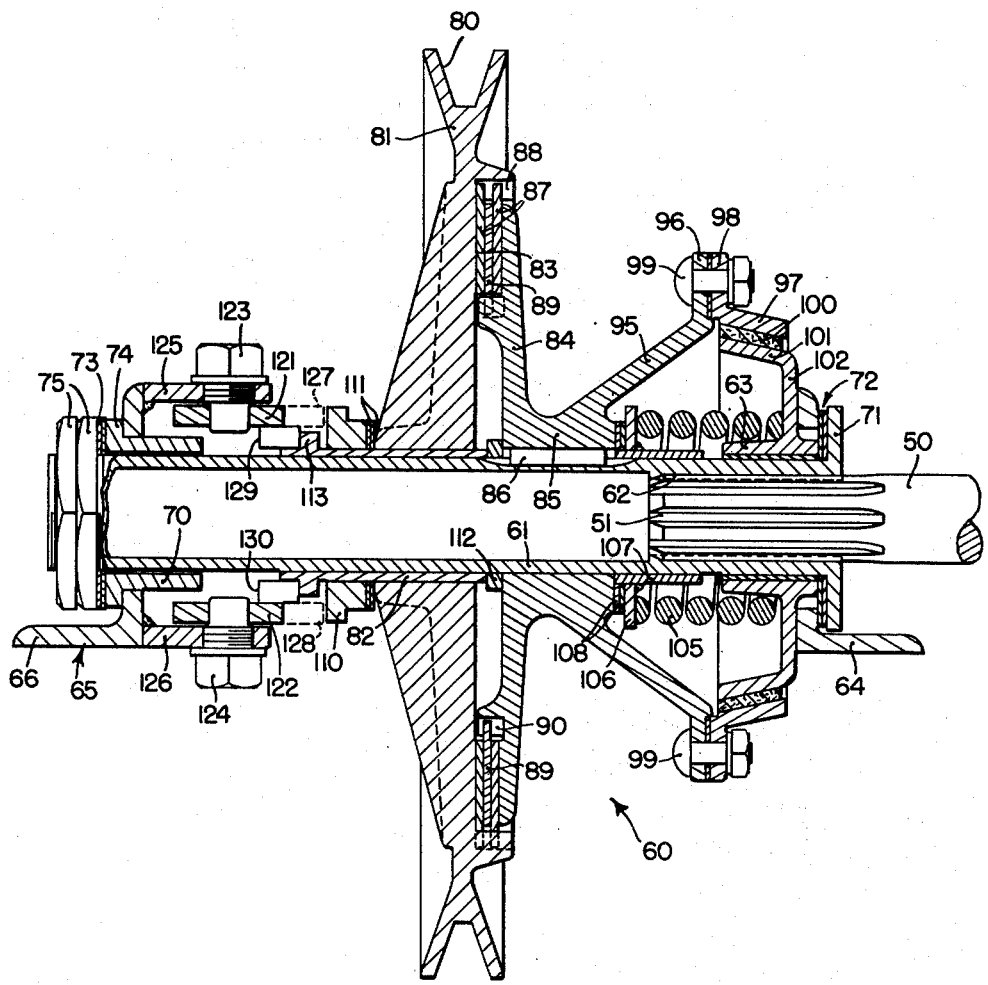
FIG. 3
INVENTOR.
HAROLD M. STUELAND
ATTORNEYS.

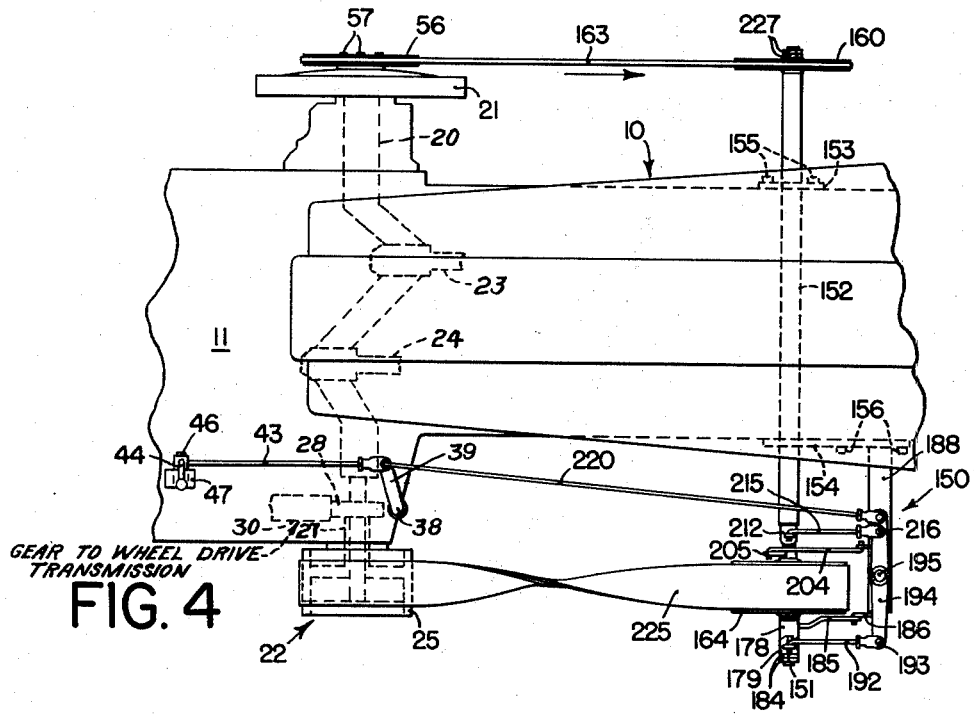
FIG. 4
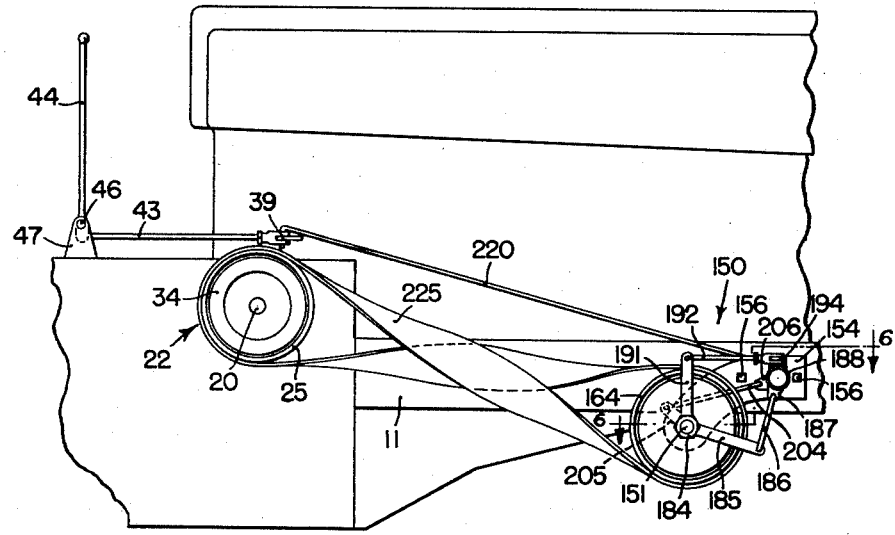
FIG. 5
INVENTOR.
HAROLD M. STUELAND
ATTORNEYS.

May 6, 1952
H. M. STUELAND
2,596,053
COORDINATED CLUTCH AND BRAKE CONTROL
FOR VEHICLE DRIVING MECHANISM
Filed May 16, 1946
5 Sheets-Sheet 5
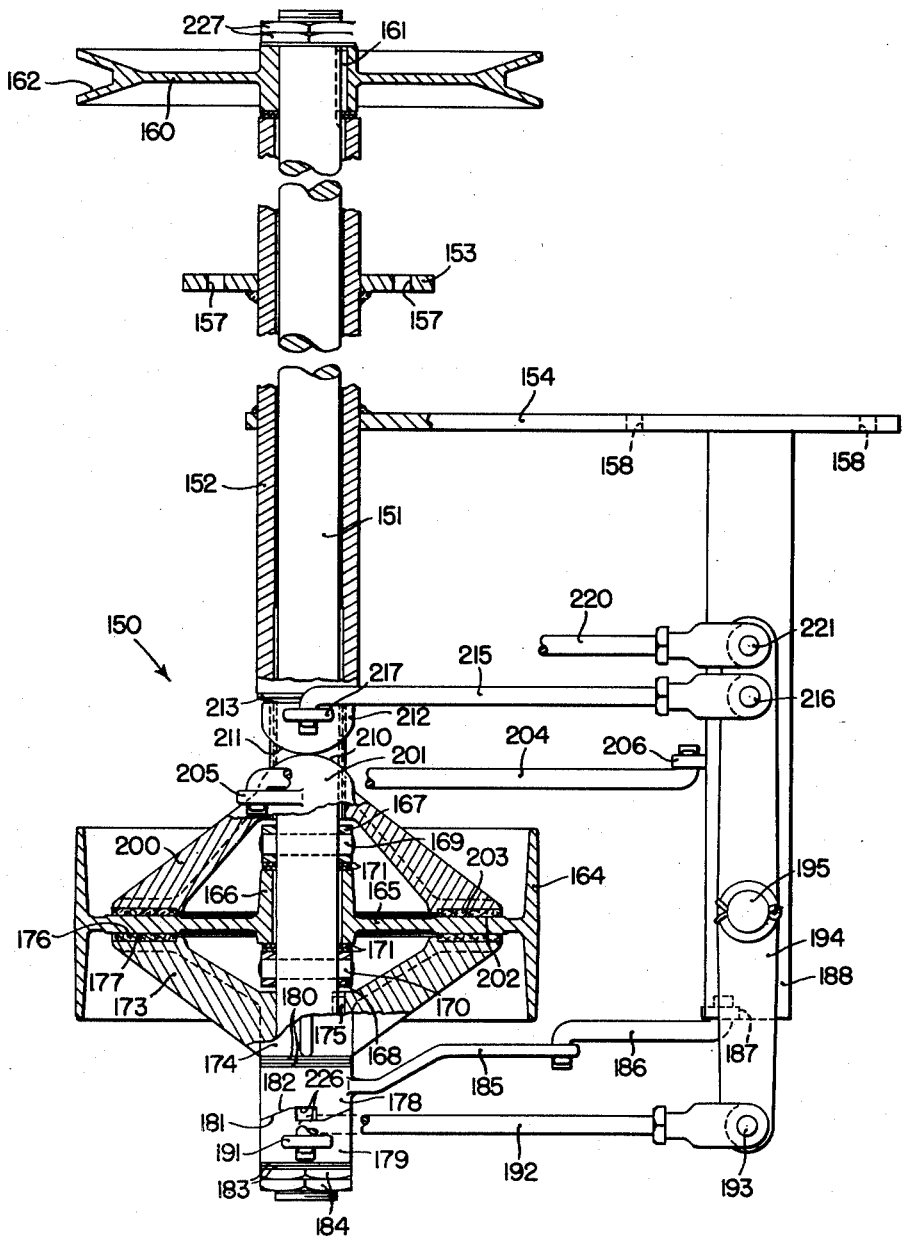
FIG. 6
*INVENTOR.*
HAROLD M. STUELAND
BY
*ATTORNEYS.*

Patented May 6, 1952

2,596,053

UNITED STATES PATENT OFFICE 2,596,053

COORDINATED CLUTCH AND BRAKE CONTROL FOR VEHICLE DRIVING MECHANISM

Harold M. Stueland, East Moline, Ill., assignor to Deere & Company, Moline, Ill., a corporation of Illinois Application May 16, 1946, Serial No. 670,257

7 Claims. (Cl. 180—70)

The present invention relates generally to tractor drive mechanism and has for its principal object the provision of a novel and improved power transmitting mechanism which can be attached externally to a tractor for driving the traction wheels of the tractor by power transmitted from the engine crank shaft through the attachment mechanism, which includes a clutch device and which is connected in such a manner that the drive attachment may be used for propelling of the tractor in one direction, and the internal transmitting mechanism may be alternatively used for driving of the tractor in the opposite direction through the conventional tractor clutch. Thus, by using the two clutches selectively for controlling the forward and rearward movement of the tractor, the operator is relieved of the necessity for shifting gears each time a change in direction of movement of the tractor is desired.

Certain types of tractor operations require frequent reversals of the direction of travel, such as, for example, when a front end mounted loader is used for loading manure or other material into a spreader or like conveyance.

Other proposals for providing a tractor with two parallel connected power transmitting systems controlled by a pair of clutches have been made in the art, from time to time, such as, for example, see Patent 2,186,306 granted to Paul, January 9, 1940. Most of the proposals made heretofore, however, entail the installation of considerable additional mechanism within the body of the tractor, which either requires a considerable amount of rebuilding of the tractor, or occupies an excessive amount of valuable space which is needed for other purposes.

More specifically, therefore, it is an object of the present invention to provide a power transmitting mechanism which can be applied as an attachment on a tractor, and is readily attachable and detachable so that it can be removed when it is not required, and which occupies a minimum of space. A further related object has to do with the provision of a drive attachment, which supplements the internal power transmitting mechanism of the tractor, whereby the latter is used to drive the tractor in one direction of rotation, and the attachment mechanism is used alternately to drive the tractor in the opposite direction of travel.

Still another object of my invention relates to the provision of an attachment mechanism which includes not only a clutch mechanism, but also a normally engaged brake mechanism for applying a brake to stop the tractor when the clutches are disengaged. One of the principal disadvantages of the prior art devices, of which I am aware, lies in the absence of braking mechanism which cooperates with the clutch mechanism to stop the tractor between reversals of movement, with the result that either the operator of the tractor is burdened with the additional duty of reaching for the tractor brake each time the tractor is reversed in direction, or, as more frequently occurs, the operator releases one clutch and immediately applies the other, which is thus required to first stop the tractor by friction between the two oppositely rotating clutch members, before it accelerates the tractor in the new direction. This causes excessive wear on the friction surfaces of the clutches, and furthermore, one or the other of the two clutches tends to drag while the tractor is standing still, thereby causing a tendency for the tractor to creep in one direction or the other, creating a hazard to life and property.

A further object of my invention, therefore, has to do with the provision of a single control lever which is connected with the two clutch mechanisms and the brake mechanism in such a manner that when the control lever is positioned in an intermediate neutral position, the brake is applied automatically, thus holding the tractor against creeping movement while it is standing idle with the engine running. By moving the control lever in either of two relatively opposite directions, one or the other of the two clutch mechanisms is thus engaged, and at the same time the brake mechanism is disengaged, to propel the tractor in a forward or reverse direction, selectively. Thus, the procedure for reversing the direction of the tractor is simplified from the normal procedure, which requires the operator to disengage the clutch, apply the brake, shift the gears to the reverse connection, release the brake, and engage the clutch, to a simple procedure which comprises merely swinging the control lever from one position to the neutral position, and then to the opposite engaged position. This leaves the operator relatively free to control the loader or other implement which is being used.

These and other objects and advantages of my invention will be apparent to those skilled in the art after a consideration of the following description, in which reference is had to the drawings appended hereto, in which:

Figure 2 is a side elevational view of the rear end of the tractor, with the near traction wheel removed to expose the attachment device;

Figure 3 is a sectional elevational view taken substantially on the line 3—3 of Figure 1;

Figure 4 is a top plan view of the intermediate portion of a tractor body, showing a modified form of power transmitting attachment embodying the principles of the present invention;

Figure 5 is a side elevational view of the embodiment shown in Figure 4; and

Figure 6 is a sectional view, drawn to an enlarged scale and taken substantially on the line 6—6 of Figure 5.

Figure 1:
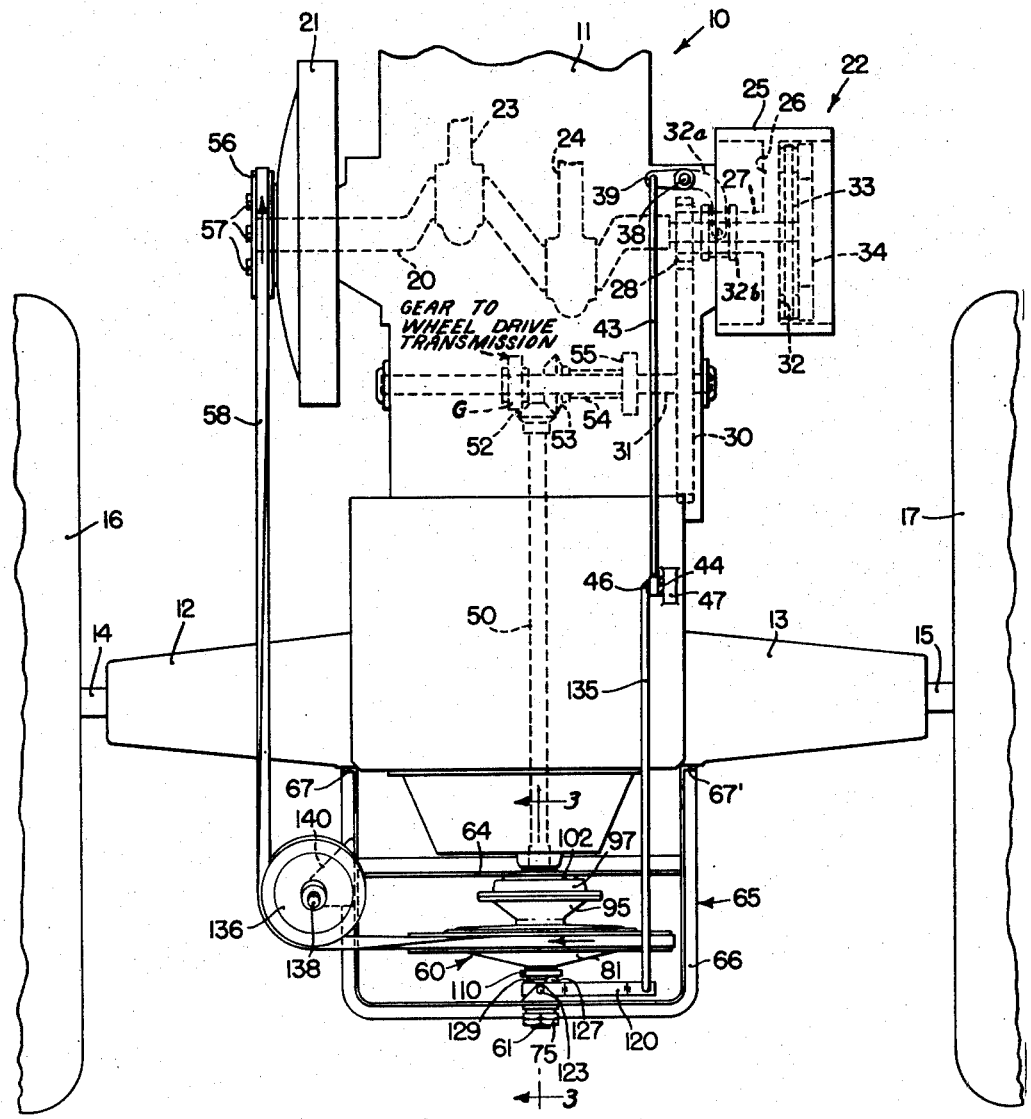
Figure 1 is a top plan view of the rear portion of a conventional tractor, on which a power transmitting attachment embodying the principles of my invention, is installed.

Referring now to the drawings and more particularly to Figures 1, 2 and 3, the tractor is indicated in its entirety by reference numeral 10 and comprises a relatively narrow, longitudinally extending body 11 carried on a pair of oppositely disposed laterally extending rear axle housings 12, 13, within which are journaled a pair of drive axles 14, 15, respectively, on which are mounted traction means such as a pair of traction wheels 16, 17, respectively. The tractor 10 is shown as a well known conventional type having a transverse crank shaft 20 which extends through the narrow tractor body 11 and has one end projecting outwardly to support an external flywheel 21, and the other end of the crank shaft 20 carries a combined clutch and belt pulley assembly 22. The tractor engine is a two cylinder design, the two piston rods being indicated by reference numerals 23, 24, and extending forwardly from the crank shaft into the cylinders (not shown).

The combined clutch and belt pulley 22 is of a well known design, which is fully disclosed in Patent 1,702,371, granted February 19, 1929 to Witry, and therefore it is not considered necessary to repeat the complete description thereof at this time, since the above patent may be referred to for the detailed description. For present purposes, the pulley and clutch assembly 22 is illustrated more or less diagrammatically, and comprises a cylindrical belt pulley 25, which is hollow and has a supporting disk or web 26, which is carried on a cylindrical sleeve or hub 27 journaled on the outer end of the crank shaft 20. A spur gear 28 is rigidly mounted on the inner end of the hub 27 and is disposed in mesh with a comparatively large diameter gear 30, which is mounted on a transversely extending transmission shaft 31, which is journaled within the body 11 of the tractor and is connected through a change speed gear mechanism and differential gear mechanism (not shown) to the drive axles 14, 15, in a manner well known to those skilled in the art. There is shown in Figure 1 a main gear G which may be taken as representative of the power input member for the final drive to the rear axles and wheels. The details of construction of one type of transmission mechanism that could be employed are completely described in Patent 2,103,543, granted to McCormick et al., December 28, 1937.

The outer surface 32 of the pulley disk 26 serves as one of the clutch elements of the clutch mechanism 22 and is part of driven means for the traction wheels 16 and 17. A clutch plate 33 is rigidly fixed on the outer end of the crank shaft 20 by suitable splines or the like (not shown), and the outer clutch disk 34 is adapted to engage the outer surface of the clutch disk 33.

The clutch is controlled by a vertically disposed control shaft 38 journaled in the tractor body and connected to a yoke 32a which is in turn engaged with an annularly grooved collar 32b, for example, as typical of suitable mechanism for effective engagement or disengagement between the pulley supporting disk 26 and clutch plate 34 responsive to alternate angular movement of the control shaft 38. The control shaft 38 is provided with an inwardly extending actuating arm 39, by which the shaft 38 can be rocked to actuate the clutch mechanism.

The control arm 39 is coupled to a rearwardly extending link 43, which is pivotally connected at 45 to the lower end of a control lever 44, which is swingably mounted on a pivot pin 46 supported on a bracket 47 on top of the tractor body. This control lever 44 and link 43 are part of the original tractor equipment and operate to engage the clutch plates 26, 33, 34 by swinging the control lever 44 forwardly from a neutral status in which the clutch 22 is disengaged, thereby swinging the link 43 rearwardly to move the actuating link 39 in a counterclockwise direction. Conversely, the clutch is disengaged by turning the control lever 44 rearwardly to a substantially vertical neutral position.

The conventional tractor is also provided with a longitudinally extending power take-off shaft 50, which extends outwardly from the rear end of the tractor body and is provided with a splined portion 51 at its rear end for the purpose of connecting the power shaft to any implement associated with the tractor to supply power thereto. As disclosed in detail in the McCormick et al. patent cited above, the forward end of the power take-off shaft 50 is connected through a pair of intermeshing bevel gears 52, 53 with a transverse shaft 54, which is connected to the transmission shaft 31 through a train of gears 55 disposed one above the other in intermeshing relation.

According to the present invention, the tractor is driven in a forward direction through its internal power transmission mechanism, with the change speed gears set in any desired connection, and the conventional tractor clutch 22 is used to connect the crank shaft 20 to the gear G and thus to the wheels 16, 17 for propelling the tractor forwardly. The tractor is driven rearwardly by power transmitted from the flywheel end of the crank shaft 20 to the rear end of the power take-off shaft 50, which drives through the bevel gears 52, 53, the shaft 54, and the train of gears 55 to the transmission shaft 31, and then through the internal change speed mechanism and gear G to the tractor axles 14, 15. To accomplish this result, the crank shaft delivers its power through driving means including a V-belt pulley 56 which is secured to the flywheel 21 by suitable bolts 57. A V-belt 58 is trained over the pulley 56, and delivers power to a clutch and brake assembly, indicated in its entirety by reference numeral 60, which is preferably the design disclosed and claimed in my Patent No. 2,281,318 granted August 7, 1945.

The assembly 60 comprises a tubular shaft 61, the interior of which is splined at its forward end at 62 to engage the splines 51 of the power take-off shaft 50. This forward end is journaled in a bearing 63, which is supported on a transverse angle member 64, which is part of an attachment frame 65, which also includes a structural angle member 66, the two ends 67, 67' of which are disposed vertically and are secured to the tractor axle housings 12, 13 by bolts 68, which engage implement supporting bosses 69 formed integrally with the axle housings, as is well known to those skilled in the art. The angle member 66 extends in a horizontal rearwardly extending U-shape, the rear portion of which carries a bearing 70, in which the rear end of the tubular shaft 61 is journaled. The forward end of the shaft 61 is provided with a radially extending flange 71, which bears against the transverse member 64 through a pair of thrust bearing shims or washers 72, and which prevents the shaft 61 from sliding rearwardly off the power take-off shaft 50. Thrust in the opposite direction is taken through a pair of thrust washers 73, which bear against a radial flange 74 on the rear end of the bearing member 70, and against a pair of lock nuts 75 threaded on the rear end of the shaft 61.

The power transmitting belt 58 engages a V-shaped groove 80 in a pulley member 81, which is journaled on a sleeve 82, the latter being slidable axially on the tubular shaft 61. The forward face 83 of the pulley member 81 serves as the continuously rotating element of the clutch 60. A driven clutch element 84 comprises a disk having a hub 85 secured to the tubular shaft 61 by a key 86, which prevents rotation of the clutch member 84 relative to the shaft 61, but permits axial sliding movement to engage the two clutch members 81, 84. The clutch is shown of the multiple plate type and comprises a plurality of axially slidable plates 87, which engage splines 88 on the pulley member 81, and an intermediate clutch plate 89 which engages axially extending splines 90 on the clutch member 84. Thus, the alternate clutch plates 87, 89 are coupled to rotate with the clutches members 81, 84, respectively and provide the friction surfaces through which power is transmitted from the pulley member 81 to the driven member 84 when the two clutch members are urged toward each other in engaged relation.

The driven clutch member 84 comprises part of brake means for the driven means which ultimately affects the traction means and for this purpose is provided with an outwardly flaring housing portion 95 provided with a radially extending flange 96, to which is secured a brake element 97 in the form of an annular frusto-conical member having a flange 98 which is secured to the flange 96 by bolts 99. The brake member 97 is provided with a brake lining 100 of asbestos or other suitable brake lining material, which engages a cooperative conical brake element 101 in the form of a flange portion which flares rearwardly from a radial flange 102 on the forward bearing member 63.

By shifting the clutch member 84 rearwardly, the inner and outer brake elements 101, 97, are brought into wedging engagement with each other, and, since the inner flange 101 is stationary, the outer brake element 97 is restrained from rotation by the frition of the brake lining 100 against the inner flange 101. Conversely, by shifting the clutch member 84 forwardly on the tubular shaft 61, the brake elements 97, 101 are separated, thereby disengaging the brake and permitting the clutch member 84 to revolve freely, together with the tubular shaft 61 and the power take-off shaft 50.

The brake elements 97, 101 are normally held in braking engagement by means of a strong compression spring 105 which encircles the tubular shaft 61 and bearing 63 between the radial flange 102 and the hub 85 of the clutch member 84. The spring 105 does not rotate and bears against the inner side of the flange 102 and acts in compression against an annular thrust member 106, which extends radially outwardly from a sleeve 107 journaled on the hollow shaft 61. A pair of thrust washers 108 are disposed between the stationary thrust member 106 and the inner end of the hub 85. The rearwardly acting force of the compression spring 105 urges the slidable clutch member 84 rearwardly, together with the tapering brake element 97, to engage the latter with the stationary brake element 101, thus energizing the brake means thereby holding the clutch element 84 stationary together with the drive means connected thereto, such as the hollow shaft 61 and the power take-off shaft 50 and ultimately the traction wheels 16 and 17.

The two clutch elements 83, 84 are engaged by shifting the normally rotating element 83 forwardly on the sleeve 82, on which it is journaled. This is accomplished by means of a thrust collar 110 which bears against a pair of thrust washers 111 adjacent the outer end of the pulley member 81. A forwardly acting pressure against the collar 110 urges the clutch member 83 into clutching engagement with the normally stationary clutch member 84, the pressure against the thrust collar 110 acting through the clutching surfaces and the clutch member 84 to force the latter forwardly on the hollow shaft 61, to separate the brake elements 97, 101, thereby permitting power to be transmitted freely from the pulley member 81 through the clutch member 84 to drive the power take-off shaft 50.

When pressure is relieved from the thrust collar 110, the compression spring 105 immediately forces the clutch member 84 rearwardly on the hollow shaft 61 to apply the braking surfaces 97, 101 to stop the rotation of the clutch member 84 and power take-off shaft 50, while the pulley member 81 continues to rotate in view of the absence of pressure against the clutch surfaces.

The brake elements 97, 101 can be disengaged without engaging the clutch, by shifting the sleeve 82 forwardly on the hollow shaft 61, into engagement with a collar 112 which bears against the rear side of the hub 85. The sleeve 82 is provided with a radially outwardly extending flange 113 adjacent its rear end, through which pressure can be exerted to force the hub 85 forwardly against the pressure of the spring 105, and thus shift the clutch member 84 and brake element 97 forwardly out of engagement with the stationary brake element 101.

The clutch and brake elements are actuated by means of a single control lever 120 (Figures 1 and 2), which is bifurcated at its lower end to provide a pair of upper and lower legs 121, 122 (see Figure 3), which are swingably mounted on a pair of pivot bolts 123, 124, respectively, the bolts being disposed in vertical alignment and supported on a pair of vertically spaced lugs 125, 126 which are rigidly fixed, as by welding, to the forward face of the frame member 66. The upper and lower legs 121, 122 of the control lever 120 are provided with a pair of cams 127, 128, which are offset to the right of the vertical pivot axis of the pivot bolts 123, 124, as best illustrated in Figure 1, whereby a forward or counterclockwise swinging movement of the control lever 120 about its supporting axis urges the cams 127, 128 forwardly into contact with the rear face of the thrust collar 110, to force the clutch members 83, 84 into coacting engagement and to disengage the brake elements 97, 101.

The upper and lower legs 121, 122 of the control lever 120 are provided with a second pair of cams 129, 130, rigidly fixed, as by welding, to the inner sides of the legs 121, 122, respectively, on the left hand side of the pivot axis 123, as viewed in Figure 1. It is evident that a rearward movement of the control lever 120 about its pivot bolts 123, 124 urges the cams 129, 130 into engagement with the radial flange 113 on the sleeve 82, forcing the latter forwardly against the thrust collar 112, to urge the hub 85 forwardly on the hollow shaft 61, thereby separating the brakes 97, 101. Inasmuch as the cams 127, 128 swing rearwardly when the lever 120 is moved rearwardly, as viewed in Figure 1, the clutch elements are not engaged at this time.

The control lever 120 inclines upwardly and toward the right from its vertical supporting axis, and the upper end of the lever is swingably connected to the rear end of a link 135 which extends forwardly and is pivotally connected to the pivot bolt 45 on the lower end of the control lever 44.

It is now evident that when the control lever 44 is in its vertical neutral position or status, both of the clutches on the tractor are disengaged and the brake elements 97, 101 are held in firm engagement by the strong compression spring 105. The crank shaft 20 of the tractor rotates continuously, in a counterclockwise direction, as viewed in Figure 2, driving the pulley member 81 in a counterclockwise direction, as viewed from the rear of the tractor, through the flexible endless V-belt 58, which is trained over the driving pulley 56 with its upper and lower runs passing above and below the tractor axle housing 12, respectively, and around a pair of idlers 136, 137, which are journaled on a pair of stud shafts 138, 139, the latter being mounted on bracket plates 140, 141. The upper bracket plate 140 is supported by bolts 142 on the side of the frame member 66 and supports the upper idler 136 in such a position that a line drawn tangent to the upper portion of the driving pulley 56 and extending rearwardly therefrom, is also tangent to the upper idler 136. The rear portion of the idler 136 is disposed in transverse alignment with the upper portion of the circumference of the driven pulley 81, so that a line drawn tangent to the latter is also tangent to the idler 136. Likewise, the lower idler 137 is positioned at such an angle that a line tangent to the lower portion of the driving pulley 56 and extending rearwardly beneath the tractor axle housing 12 is also tangent to the side of the lower idler 137. The rear portion of the circumference of the idler 137 is disposed in transverse alignment with the lower side of the driven pulley 81 so that a common tangent can be drawn therebetween. Both the upper and lower runs of the V-belt 58 are twisted through an angle of ninety degrees between the driving pulley and the idlers, and are untwisted back to normal position between the idlers and the driven pulley.

The driving pulley 56 drives the driven pulley 81 through the belt 58 in a direction opposite to that in which the power take-off shaft 59 normally operates when the tractor is driven forwardly through the conventional clutch mechanism 22. Hence, when power is transmitted through the clutch mechanism 60, driving the power take-off shaft 59 in a reverse direction, the power is transmitted to the tractor wheels 16, 17 through the conventional change speed gears, gear G and drive axles 14, 15 to drive the tractor rearwardly.

During operation, the tractor is driven forwardly by swinging the control lever 44 forwardly to one active status or position, thereby engaging the clutch 22 in the usual manner. At the same time, the link 135 is shifted rearwardly to swing the lever 120 in a clockwise direction, as viewed in Figure 1, thereby engaging the camming members 129, 130 with the radial flange 113 on the member 82 and de-energizing the brake means by releasing the brake elements 97, 101. The tractor continues to move forwardly until the control lever 44 is returned to neutral position, thereby disengaging the clutch 22 and reengaging the brake elements 97, 101 to stop the tractor and hold it against any creeping forward or rearward in case either of the clutches 22 or 60 tends to drag slightly.

By shifting the control lever 44 rearwardly, or to a second active status, the link 135 is moved forwardly, thereby swinging the lever 120 in a counterclockwise direction, as viewed in Figure 1, and engaging the thrust collar 110 by the cams 127, 128, thereby engaging the clutch elements 83, 84 and simultaneously disengaging the brake elements 97, 101. It will be noted that the clutch elements 83, 84 engage slightly before the brake elements 97, 101 are disengaged, thereby making the movements of the tractor positive and under absolute control of the control lever 44 at all times. When the clutch elements 83, 84 are engaged, the conventional tractor clutch 22 is disengaged, for there is sufficient room for movement of the control shaft 38 and clutch control mechanism connected thereto in a disengaging direction to provide for a sufficient length of stroke of the control lever 44 to engage the rear clutch mechanism 60, although if necessary, sufficient play can be introduced in the connections between the link 43 and the arm 39 or control lever 44 to provide ample lost motion for this purpose.

It is thus evident that with the mechanism shown and described herein, the forward and rearward movement of the tractor can be controlled by the single control lever 44, and the brake is applied in the neutral position of the lever, thereby eliminating the necessity for shifting gears and for independent application of the brakes, with the result that the operation of the tractor is much simplified, permitting the operator to devote his attention to the control of the loader or othehr implement associated therewith.

Referring now more particularly to the embodiment shown in Figures 4, 5 and 6, the tractor 10 of this embodiment is identical with the tractor shown in Figures 1, 2 and 3, and is equipped with the same kind of clutch mechanism 22 and transmission mechanism to the rear wheels of the tractor. In this embodiment, however, the power for driving the tractor in the reverse direction is not transmitted from the flywheel 21 to the power take-off shaft, but rather is transmitted to the belt pulley 25 to drive the latter in reverse direction by means of a power transmitting attachment, indicated generally by reference numeral 150.

The attachment 150 comprises a transverse counter shaft 151, which is disposed transversely beneath the body 11 of the tractor 10 and forwardly of the crank shaft 20. The shaft 151 is journaled in a long tubular member 152, which is rigidly fixed at laterally spaced points to a pair of supporting plates 153, 154, secured by bolts 155, 156 to the opposite sides of the tractor body 11, respectively. The bolts 155 are inserted through suitable apertures 157 in the supporting plate 153, while the bolts 156 are inserted through other apertures 158 in the supporting plate 154. The shaft 151 extends laterally from the end of the tubular member 152 adjacent the flywheel 21 to receive a pulley 160 mounted thereon and secured against rotation relative thereto by a key 161, which permits a limited amount of axial movement of the pulley 160 for purposes of adjustment, as will be explained later. The pulley 160 is provided with a V-shaped groove 162 adapted to receive a V-belt 163 which is trained around the driving pulley 56 secured to the flywheel 21 by bolts 57, as explained hereinbefore.

The shaft 151 extends appreciably beyond the opposite side of the tractor and beyond the end of the tubular member 152, to receive a belt pulley 164 mounted thereon. The belt pulley 164 is mounted on a supporting disk or web 165 which is formed integrally with a hub 166, which is journaled on the shaft 151 intermediate the ends of the latter. A pair of thrust collars 167, 168 are fixed to the shaft 151 by diametrically extending pins 169, 170, respectively, to prevent axial shifting movement of the hub 166 relative to the shaft 151. Thrust washers 171 are disposed on the shaft 151 between each end of the hub 166 and the thrust collars 167, 168.

The belt pulley 164 is driven by power transmitted through the shaft 151 and through connectible and disconnectible drive means including a clutch member 173, which is generally bell shaped and has a supporting hub 174 secured to the shaft 151 by a key 175 preventing relative rotation therebetween, but permitting axial sliding movement of the clutch member through a limited range of movement. The clutch member 173 is provided with a frictional engaging surface 176, which is shiftable into engagement with a flat cooperative clutching surface 177 on the side of the pulley web 165 when the clutch member 173 is urged inwardly against the pulley, the thrust reaction being taken by the thrust collar 167. The clutch member 173 is shifted axially on the shaft 151 by means of a pair of cooperative camming members 178, 179, which are rockable on the shaft 151 adjacent the outer end thereof. The camming members 178, 179 are in the form of hubs or sleeves, which are provided with interengaging inclined camming surfaces 181, 182, respectively, which act to force the camming members 178, 179 axially apart responsive to relative angular movement thereof about the axis of the shaft 151. The inner camming member 178 transmits force through a plurality of thrust bearing washers 180 to the outer surface of the clutch hub 174 and the reaction of this thrust is absorbed through a plurality of thrust bearing washers 183 against a pair of lock nuts 184 threaded on the end of the shaft 151. The inner camming member 178 is provided with a holding arm 185, preferably formed integrally therewith and extending forwardly therefrom. The arm 185 is connected by a link 186 to a downwardly extending lug 187, which is fixed, as by welding, to a laterally extending beam 188 supported on the supporting plate 154 and extending transversely in front of the shaft 151.

The other camming member 179 is provided with an upwardly extending actuating arm 191, preferably integral therewith and connected by an actuating link 192 which extends forwardly from the upper end of the arm 191 and is pivotally connected by a pivot pin 193 to the outer end of an actuating lever 194, swingably mounted on a vertically extending stub shaft 195, which is rigidly fixed to the transverse handle lever beam 188. During rotation of the shaft 151, when the outer camming member 179 is shifted angularly in a counterclockwise direction, as viewed in Figure 5, relative to the inner camming member 178 which is held against rotation by the arm 185 and link 186, the action of the camming surfaces 181, 182 forces the inner member 178 against the outer face of the hub 174 through the thrust washers 180, thereby shifting the clutch member 173 toward the pulley web 165, engaging the clutching surfaces 176, 177 and transmitting power to rotate the pulley 164. This is accomplished by swinging the actuating lever 194 in a clockwise direction about the stub shaft 195, as viewed in Figure 6. The lever 194 is shown in Figure 6 in a neutral position, in which the lever is substantially parallel to the transverse supporting beam 188.

A brake means for the driven means (including the pulley 164) comprising a generally bell shaped braking member 200 is disposed on the opposite side of the pulley web 165 and is provided with a mounting hub 201 which embraces the shaft 151 and is journaled thereon and is also free to shift axially on the shaft 151 throughout a limited range of movement. The braking member 200 is provided with a frictional brake surface 202 engageable with a cooperative flat surface 203 on the inner face of the pulley web 165. The brake member 200 is held stationary by means of a link 204 connected to an arm 205 preferably formed integrally with the hub 201, and the link 204 is connected at its forward end with an ear 206, which is rigidly fixed, as by welding, to the transverse beam 188. The hub 201 is provided with a pair of diametrically spaced camming surfaces 210 on the inner end thereof, which are engageable with cooperative camming surfaces 211 on a brake actuating collar 212, which is journaled on the shaft 151 between the hub 201 and the adjacent end of the supporting tube 152. A spring washer 213 encircles the shaft 151 between the end of the tube 152 and the adjacent end of the actuating collar 212.

Figure 6 shows the actuating member 212 disposed in its brake engaging position, with the high parts of the camming surfaces 210, 211 in contact with each other, thereby urging the braking member 200 into braking engagement with the surface 203 of the pulley web 165. The actuating member 212 reacts against the spring washer 213, which provides a resilient backing for resisting the thrust of the camming faces 210, 211. Angular movement of the camming member 212 in either direction from the neutral position as shown, moves the high point of the cam 211 out of engagement with the high point on the cam 210, thereby relieving the thrust against the brake member 200. The angular movement of the camming member 212 is provided by means of a link 215 which is pivotally connected at 216 to the actuating lever 194, at a point spaced inwardly from the pivot shaft 195 on the opposite side from the link connection 193 to the clutch mechanism. The link 215 extends rearwardly from the lever 194 and is swingably connected to an upwardly extending arm 217 which is rigidly fixed, as by welding, to the camming member 212.

The actuating lever 194 is moved in a horizontal plane about the vertical axis of the pivot pin 195 by means of a control link 220, which is connected by a pivot pin 221 to the inner end of the lever 194 and extends rearwardly therefrom, the rear end of the link 220 being pivotally connected to the actuating arm 39 and hence through the control link 43 to the control lever 44.

The belt pulley 164 of the attachment 150 is connected with the tractor belt pulley 25 by means of a flexible, endless, flat power-transmitting belt 225, which is crossed between the two pulleys so that clockwise rotation of the pulley 164, as viewed in Figure 5, will cause a counterclockwise rotation of the tractor belt pulley 25.

During operation, the crank shaft and flywheel 21 of the tractor rotate in the direction of the arrow (clockwise), as shown in Figure 4, and drive through the V-belt 163 to rotate the shaft 151 in a clockwise direction, as viewed in Figure 5. When the operator swings the control lever 44 forwardly from its vertical neutral position, the clutch mechanism 22 within the belt pulley 25 is engaged, as explained hereinbefore, to drive the tractor forwardly through the conventional tractor transmission mechanism, at which time the belt pulley 22 rotates in a clockwise direction, as viewed in Figure 5. Shifting the control lever 44 forwardly causes the link 220 to move rearwardly and thereby swings the actuating lever 194 in a counterclockwise direction. This acts through the link 215 to swing the vertical arm 217 rearwardly, releasing the pressure on the brake member 200 and permitting the pulley 164 to rotate freely on the shaft 151 in a counterclockwise direction by power received through the crossed belt 225 from the tractor belt pulley 25. At the same time, the link 192 is pulled forwardly, but the camming members 178, 179 are not shifted axially of the shaft 151, for the camming surfaces bear against a pair of faces 226 which lie in parallel radial planes with respect to the axis of the shaft 151. Hence, neither the clutch member 173 nor the brake member 200 is in engagement with the pulley web 165 during forward movement of the tractor.

When the control lever 44 is returned rearwardly to vertical neutral position, the clutch mechanism 22 is disengaged and the forward shifting movement of the connecting link 220 shifts the actuating lever 194 in a clockwise direction, as viewed in Figure 6, back to the transverse neutral position, and at the same time engaging the camming surfaces 210, 211 to force the brake surfaces 202, 203 into engagement, thereby braking the tractor through the belt 225.

To drive the tractor in reverse, the operator pulls rearwardly on the control lever 44, thereby swinging the actuating lever 194 in a clockwise direction to disengage the high points on the camming members 211, 212, to release the brake, and forcing the link 192 rearwardly to shift the outer camming member 179 in a counterclockwise direction, thereby forcing the inner camming member 178 inwardly and applying pressure against the clutch member 173 to engage the clutch faces 176, 177. This causes the belt pulley 164 to rotate with the shaft 151 in a clockwise direction, thereby transmitting power through the crossed belt 225 to drive the tractor belt pulley 25 in a counterclockwise direction, which drives through the conventional tractor transmission to propel the tractor rearwardly.

Wear that occurs on the braking surfaces 202, 203, can be compensated for by adjustment of a pair of lock nuts 227 against the drive pulley 160, thereby shifting the shaft 151 and the belt pulley 164 thereon outwardly relative to the tubular member 152 and brake member 200, thereby bringing the surfaces 202, 203 into closer engagement. This also has the effect of bringing the clutch member 173 into closer frictional engagement with the clutch surface 176. Further adjustment of the clutching surfaces 176, 177 can be made by adjusting the lock nuts 184 to shift the camming members 178, 179 and the clutch member 173 axially relative to the belt pulley 164.

I claim:

1. Drive mechanism for a tractor or the like having traction means, comprising in combination, an engine crankshaft, a transmission shaft element connected to said traction means, a first clutch mechanism interconnecting said crankshaft and said transmission shaft element and engageable to drive the latter in a forward direction, a power take-off element connected with said transmission shift element, a second clutch mechanism interconnecting said crankshaft and said power take-off element and engageable to drive said transmission shaft element in a reverse direction, brake means associated with one of said clutch mechanisms for braking the element driven by the latter, a control member movable into three spaced positions, and means connecting said member with said first and second clutch mechanisms and with said brake means and constructed and arranged to engage either of said clutch mechanisms or said brake means, selectively, by movement of said member into said three positions, respectively.

2. In a tractor having a longitudinally extending body carried on a pair of laterally spaced traction wheels, the combination of a transverse engine crankshaft extending outwardly of said body on one side thereof, a transmission shaft in said body connected to said traction wheels, a first clutch mechanism interconnecting said crankshaft and said transmission shaft and engageable to drive the latter in one direction, a power take-off shaft connected with said transmission shaft and extending rearwardly out of the rear end of said body, an external power transmitting connection between the outwardly extending ends of said crankshaft and said power take-off shaft and including a second clutch mechanism engageable to drive said transmission shaft in the opposite direction through said power take-off shaft, brake means associated with said second clutch mechanism for braking said power take-off shaft and hence said transmission shaft and said wheels, a control lever mounted on said tractor for shifting movement in either of two relatively opposite directions from an intermediate neutral position, and means connecting said lever with said first and second clutch mechanisms and with said brake means so constructed and arranged as to engage said brake means and disengage both clutch mechanisms when said lever is in said neutral position, and to disengage said brake means and engage said clutch mechanisms, selectively, by shifting said lever in said opposite directions, respectively.

3. The combination set forth in claim 2, including the further provision that said external power transmitting connection includes a first pulley mounted on the outer end of said crankshaft, a second pulley mounted on said power take-off shaft, a pair of vertically spaced idlers mounted on said tractor rearwardly of said first pulley and laterally of said second pulley, and a single endless power transmitting belt trained over said first pulley and extending rearwardly therefrom, then trained over said vertically spaced idlers and extending laterally therefrom and trained over said second pulley.

4. An attachment for driving a rearwardly extending splined power take-off shaft on a tractor from a transversely extending power shaft on said tractor to propel the tractor independently of the engine clutch of the tractor, comprising in combination, a driving pulley adapted to be fixed to said power shaft, an extension shaft adapted for connection to said splined shaft, a supporting frame on which said extension shaft is journaled and adapted to be mounted on the rear end of the tractor, a driven pulley journaled on said extension shaft, clutch means separate from the engine clutch and including a clutch element on said driven pulley and a cooperable clutch element keyed to said extension shaft but slidable axially thereon, a pair of cooperable brake elements on said slidable clutch element and on said frame, respectively, control means for engaging said clutch elements and disengaging said brake elements and vice versa, a power transmitting belt adapted to engage said pulleys, and idlers adapted to support the two runs of said belt for training said runs around a substantially ninety degree turn.

5. In a tractor having a longitudinally extending body carried on a pair of traction wheels, the combination of a transverse engine crankshaft extending outwardly of said body on one side of the latter, a driving pulley fixed to said crankshaft, a transmission shaft in said body connected to said tractor wheels, a driven pulley disposed on the opposite side of said tractor body and connected with said transmission shaft, a first clutch mechanism interconnecting said crankshaft and said driven pulley and engageable to drive said transmission shaft in one direction, a transverse auxiliary shaft mounted on said tractor body, a pair of pulleys mounted on said shaft in alignment with said driving and driven pulleys, respectively, a pair of belts trained over the two pairs of aligned pulleys, respectively, one of said belts being crossed, a second clutch mechanism associated with one of said pair of pulleys and engageable to transmit power from said driving pulley through said auxiliary shaft to said driven pulley to drive said transmission shaft in the reverse direction, brake means connected with said auxiliary shaft, a control lever mounted for shifting movement in either of two relatively opposite directions from an intermediate neutral position, and means connecting said lever with said first and second clutch mechanisms and with said brake means so constructed and arranged as to engage said brake means and disengage both clutch mechanisms when said lever is in said neutral position, and to disengage said brake means and engage said clutch mechanisms, selectively, by shifting said lever in said opposite directions, respectively.

6. In a tractor having a longitudinally extending body carried on a pair of traction wheels, the combination of a transverse engine crankshaft extending outwardly of said body on one side of the latter, a driving pulley fixed to said crankshaft, a transmission shaft in said body connected to said tractor wheels, a driven pulley disposed on the opposite side of said tractor body and connected with said transmission shaft, a first clutch mechanism interconnecting said crankshaft and said driven pulley and engageable to drive said transmission shaft in one direction, a transverse auxiliary shaft mounted on said tractor body, a pair of pulleys mounted on said shaft in alignment with said driving and driven pulleys, respectively, one of said pair of pulleys being fixed to said auxiliary shaft and the other being journaled thereon, a second clutch mechanism including an axially shiftable clutch element keyed to said auxiliary shaft and engageable with said pulley journaled thereon, braking mechanism anchored on said body and engageable with said journaled pulley, a pair of belts connecting said driving and driven pulleys with said pair of pulleys, respectively, one of said belts being crossed, a control lever mounted for shifting movement in either of two relatively opposite directions from an intermediate neutral position, and means connecting said lever with said first and second clutch mechanisms and with said brake means so constructed and arranged as to engage said brake means and disengage both clutch mechanisms when said lever is in said neutral position, and to disengage said brake means and engage said clutch mechanisms, selectively, by shifting said lever in said opposite directions, respectively.

7. Drive mechanism for a tractor having traction means, comprising, an engine crankshaft, a first output element connected to and driven by the crankshaft, a second output element connected to and driven by the crankshaft, transmission mechanism connected to the traction means, first clutch means selectively connectible or disconnectible between the first output element and the transmission mechanism, second clutch means selectively connectible or disconnectible between the second output element and the transmission mechanism, means interconnecting the two clutch means for selectively effecting simultaneous disconnection of both or connection of either without connection of the other, brake means selectively energizable or deenergizable for braking or releasing the transmission mechanism, and means interrelating the brake means with the clutch-interconnecting means for effecting energizing of the brake means when both clutch means are disconnected and for deenergizing the brake means when either clutch means is connected.

HAROLD M. STUELAND.

REFERENCES CITED

The following references are of record in the file of this patent:

UNITED STATES PATENTS

| Number | Name | Date |
|---|---|---|
| 341,491 | Masterman | May 11, 1886 |
| 603,047 | Pickering | Apr. 26, 1898 |
| 812,703 | Truitt | Feb. 13, 1906 |
| 938,196 | Wyman | Oct. 26, 1909 |
| 1,665,984 | Scaggs | Apr. 10, 1928 |
| 1,684,705 | Humphreys | Sept. 18, 1928 |
| 1,702,371 | Witry | Feb. 19, 1929 |
| 1,938,855 | Moyer | Dec. 12, 1933 |
| 2,037,643 | Voigt | Apr. 14, 1936 |
| 2,175,383 | Eason | Oct. 10, 1939 |
| 2,186,306 | Paul | Jan. 9, 1940 |
| 2,301,133 | McElhinney et al. | Nov. 3, 1942 |